United States Patent [19]

Inamoto et al.

[11] 4,391,314
[45] Jul. 5, 1983

[54] SNOW TIRE SPIKES

[75] Inventors: Jiro Inamoto, Amagasaki; Naohiro Hayata, Kakogawa, both of Japan

[73] Assignees: Sumitomo Electric Industries, Ltd., Osaka; Sumitomo Rubber Industries, Ltd., Kobe, both of Japan

[21] Appl. No.: 250,302

[22] Filed: Apr. 2, 1981

[30] Foreign Application Priority Data

Apr. 7, 1980 [JP] Japan ................................ 55-45423

[51] Int. Cl.³ ............................................ B60C 11/00
[52] U.S. Cl. .................................... 152/210; 411/900
[58] Field of Search ............... 152/210, 168, 169, 222, 152/211, 212; 168/29, 31, DIG. 1; 238/14; 301/41 R, 44 R, 43; 411/504, 511, 900, 901, 904, 908; 36/67 R, 67 A, 67 D

[56] References Cited

U.S. PATENT DOCUMENTS

| 3,272,252 | 9/1966 | Nordquist | 152/211 |
| 3,363,658 | 1/1968 | Coubrough | 152/211 |
| 3,480,062 | 11/1969 | Hillhouse | 152/210 |
| 3,666,613 | 5/1972 | Beninga | 152/210 X |
| 3,911,986 | 10/1975 | Cantz | 152/210 |
| 3,934,632 | 1/1976 | Kalpin | 152/210 |
| 4,076,065 | 2/1978 | Somers | 152/210 |
| 4,262,723 | 4/1981 | Bourcier de Caron de Previnquieres | 152/222 |

Primary Examiner—William A. Powell
Assistant Examiner—Thomas Bokan
Attorney, Agent, or Firm—Wenderoth, Lind & Ponack

[57] ABSTRACT

The present invention relates to snow tire spikes for use with automobiles adapted to run on frozen road surfaces or on snow. The snow tire spike comprises a spike body formed by using a ceramic stock molded by pressing with dies and a flange made of plastics which coats at least the end part of the spike body which is attached to the tire. The anchoring part formed at the attaching end of the spike body has a larger diameter than the opposite end of the spike body, but has a diameter smaller than 1.5 times that of the latter. This larger diameter part is wholly coated with plastics, and is unified with the outer circumferential part of the spike body through a smoothly tapered or arc-shaped joining surface.

6 Claims, 7 Drawing Figures

SNOW TIRE SPIKES

FIELD OF THE INVENTION

The present invention relates to a snow tire spike which comprises a spike body formed by using a ceramic stock molded by pressing with dies, and a flange made of plastics coated on at least that end part of the spike body which is to be attached to a tire.

DESCRIPTION OF THE PRIOR ART

Heretofore, a spikes for snow tires for use on snow or on ice, those with (referring to FIGS. 1 and 2) a pin 2 made of a cemented carbide or a ring 3 made of a cemented carbide bound to a steel shank 1 by soldering or press fitting, etc., have been known.

In the spikes fabricated in this manner, for the pins or rings joined by way of soldering or press fitting, etc., those made of cemented carbide are employed. Therefore, they are very costly. Such spikes are heavy in weight, and since the advancement of wear of such a spike is slower than that of the tire, its protrusion from the tire surface tends to become longer than is necessary. As a consequence, such spikes have disadvantages involving high fuel cost, loud noise, removal of spikes due to centrifugal force, heavy injury to road surface, etc.

SUMMARY OF THE INVENTION

The present invention, intended to overcome the above-described disadvantages of conventional snow tire spikes, offers a snow tire spike comprising a spike body formed with a ceramic stock molded by pressing with dies, and a flange part, for its secure attachment to a tire, molded of plastics, the attaching end part of the spike body being formed to be a larger diameter anchoring part with a diameter larger than that of the ground touching end part of the spike body but no more than 1.5 times the latter, this larger diameter part being entirely coated with plastics, and unified through a smoothly shaped surface with the outer circumferential part of the spike body extending contiguously to the ground touching end part. The spike formed in this manner is light in weight, receives moderate abrasion, and is low priced.

Thus, the snow tire spike has a first end, defined by a first radially outer annular surface, for anchoring the spike in a tire, and a second end, defined by a second radially outer annular surface, for contacting the ground when the spike is in use in the tire. These first and second radially outer annular surfaces are joined by a third radially outer annular surface to form a continuous smooth surface at least from the second end to the first surface.

DETAILED DESCRIPTION OF THE INVENTION

Integrally forming the whole spike including the flange part is feasible, but involves some difficulties. Thus the flange has a diameter on the order of twice that of the spike body, such a size being hard to achieve through pressing with dies. It must be formed by machining, etc., at elevated cost. With known methods of molding other than pressing with dies such as slip casting, etc., it is difficult to produce high grade ceramic stock.

Furthermore, the flange part receives the impact when striking the spike into the tire, resulting in probable breakdown.

However, in the spike of this invention, the larger diameter anchoring part at the attaching end of the spike body is coated with plastics to form the flange, so that the ceramic stock would be protected from the impact, if imposed on the flange part when striking the spike into the tire.

Figure 1:
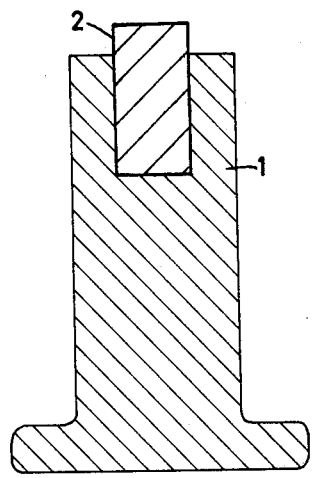
FIG. 1 is a longitudinal sectional view of a conventional spike with a pin made of a cemented carbide.
Figure 2:
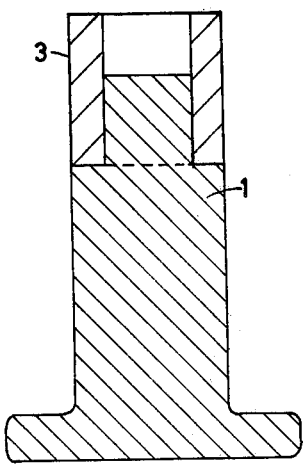
FIG. 2 is a longitudinal sectional view of a conventional spike with a ring made of a cemented carbide.
Figure 3:
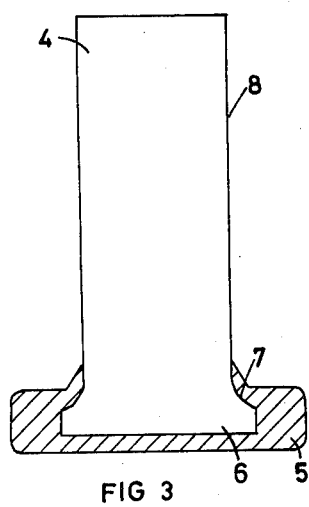
FIG. 3 is a longitudinal sectional view of a first embodiment of the spike of this invention.

In FIG. 3, the spike body 4 is formed of a ceramic material, while the flange part 5 to be held in the tire is made of plastics.

At the attaching end of the spike body 4 a larger diameter anchoring part 6 with a diameter smaller than 1.5 times that of the ground touching end part, is formed, this part being integrally coated with plastics to form flange part 5.

Furthermore, the larger diameter anchoring part 6 and the outer circumferential part of the spike body 4 are continuously formed through an intermediary surface 7 which is smoothly tapered or arc-shaped, whereby concentration of stress on this part is relieved, thereby to provide larger strength. In addition, since the larger diameter part has a diameter smaller than 1.5 times the diameter of the ground touching end, such a part may be readily molded by pressing with dies in the axial direction without requiring complex dies.

Figure 4:
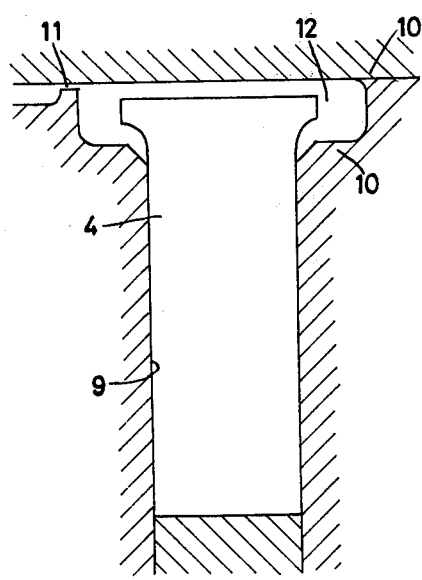
FIG. 4 is a longitudinal sectional view of the spike body shown in FIG. 3 being set in dies.

The method of forming the spike shown in FIG. 3, thus, the method for joining the spike body with the plastic flange, is described with reference to FIG. 4.

In order to provide an area 8 not coated with the plastics, which is either part or all of the surface other than that of the larger diameter anchoring part 6 of the spike body 4, the ceramic part is so incorporated into the die 10 that the said area 8 is inserted in the hole 9 of the flange molding die 10, and then, the plastics is injected into the molding space 12 through a gate 11 provided at the part corresponding to one side of the flange forming part, for example. In that way, coincidentally with molding the flange, the larger diameter anchoring part at the attaching end of the spike body is embedded in the flange.

Figure 5:
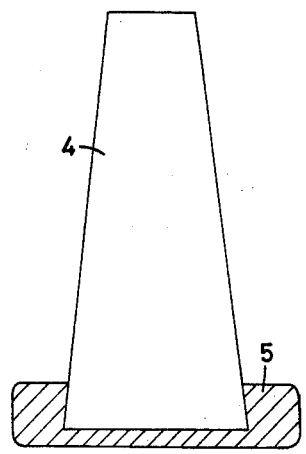
FIG. 5 is a longitudinal sectional view of a second embodiment of the spike of this invention.

FIG. 5 shows a second embodiment of the spike of this invention, in which the spike body 4 is in a tapered shape as a whole, with its larger diameter part being integrally coated with a flange molded by injecting plastics in a similar manner as in the first embodiment.

Figure 6:
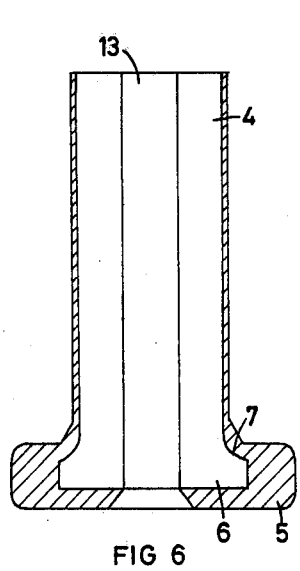
FIG. 6 is a longitudinal sectional view of a third embodiment of the spike of this invention.
Figure 7:
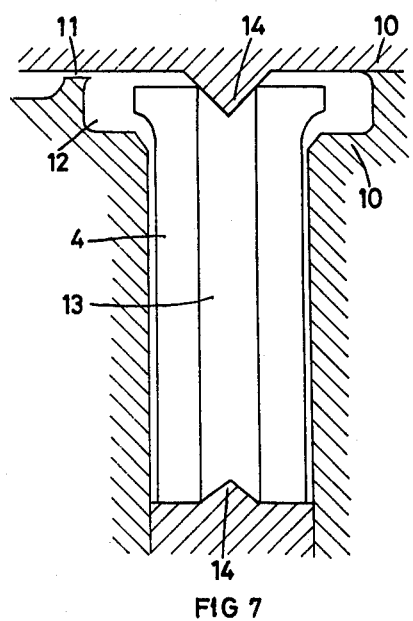
FIG. 7 is a longitudinal sectional view of the spike body shown in FIG. 6 being set in dies.

In a third embodiment, an even more effective spike of reduced weight may be obtained by providing a hole 13 of a proper size through the axial center of the body 4, as shown in FIG. 6. In forming the spike shown in FIG. 6, the ceramic part is held in the dies by engaging the hole 13 with protrusions 14 formed on the inside surfaces of the injection molding dies 10, as shown in FIG. 7. In that way, it is possible to coat all of the ceramic part with the plastics as shown in FIG. 6.

It should also be noted that the spikes of the first and the second embodiments above-mentioned may each be provided with a hole through its axial center.

The weight of the spike of this invention varies with the diameter of the spike body and whether it is holed or not, but is around 1.5 g, which is less than half the weight of the most representative shape of the cemented carbide pin type currently in use, approximately 3.5 g.

Although ceramic materials, generally having low break strengths and being vulnerable to impact, have the possibility of suffering breakdown while in use, evidence has been obtained that a ceramic material so compounded and sintered that the purity of alumina runs higher than 99% (by weight), the mean particle diameter of the alumina crystals is smaller than $2\mu$, and its porosity is lower than 2%, is strong enough to bear practical use.

Furthermore, the ceramic material is rather inferior to the cemented carbides in abrasion on sand and gravel, and this makes it possible for this material to receive moderate wear which is in pace with the progress of the wear of the tire.

The plastics used for molding the flange need not be particularly restricted, but nylon is most suitable where wear resistance, strength, molding characteristic and price count.

As described in the foregoing, in the spikes of the present invention, as compared with conventional spikes with cemented carbide joined at their tips, the weight is reduced to below one half, and a moderate wear in harmony with the wearing of the tire is achieved.

Since the ceramic part has the outer circumferential part of the spike body extending with a smoothly shaped surface from its larger diameter anchoring part, its molding can be made by pressing the ceramic part with dies, and moreover, because the joining between the flange and the spike body may be made simultaneously with the molding of the flange, the separate process for this joining, which is otherwise required, is spared, thus enabling production of a low priced spike through reduction in the manufacturing cost.

What is claimed is:

1. A snow tire spike which comprises:
a single, integral spike body made of a ceramic material, said spike body having a first end, defined by a first radially outer annular surface, for anchoring said spike in a tire, and a second end, defined by a second radially outer annular surface, for contacting the ground when said spike is in use in the tire, said first end having a diameter larger than, but smaller than 1.5 times, the diameter of said second end, said first and second radially outer annular surfaces being joined by a third radially outer annular surface to form a continuous smooth surface at least from said second end to said first surface; and
a flange made of a plastic material coated directly on at least said first surface of said spike body, on the entirety of said first surface.

2. A snow tire spike according to claim 1 wherein the ceramic material used for forming the spike body is alumina in a purity higher than 99% by weight, the mean particle diameter of the alumina crystals being smaller than $2\mu$, and the porosity of the ceramic material being lower than 2%.

3. A snow tire spike according to claim 1 wherein the first, second and third radially outer annular surfaces jointly form a tapered surface extending radially inwardly from the first end of the spike body to the second end of the spike body.

4. A snow tire spike according to claim 3 wherein the ceramic material used for forming the spike body is alumina in a purity higher than 99% by weight, the mean particle diameter of the alumina crystals being smaller than $2\mu$, and the porosity of the ceramic material being lower than 2%.

5. A snow tire spike according to claim 3 wherein the spike body is provided with a hole through its axial center.

6. A snow tire spike according to claim 1 wherein the spike body is provided with a hole through its axial center.

* * * * *